United States Patent
Blubaugh et al.

[15] 3,704,522
[45] Dec. 5, 1972

[54] METHOD AND APPARATUS FOR OPTICAL ALIGNMENT OF INDUSTRIAL EQUIPMENT

[72] Inventors: Robert L. Blubaugh; Robert A. Ruckle; Hubert J. Watts, all of Ponca City, Okla.

[73] Assignee: Continental Oil Company, Ponca City, Okla.

[22] Filed: Jan. 19, 1970

[21] Appl. No.: 3,968

Related U.S. Application Data

[63] Continuation-in-part of Ser. Nos. 702,478, Feb. 1, 1968, abandoned, and Ser. No. 836,503, June 25, 1969.

[52] U.S. Cl. ...................... 33/286, 33/1 H, 33/296
[51] Int. Cl. .......................................... G01c 21/00
[58] Field of Search .......... 33/46 AT, 74 D, 1 H, 1 R

[56] References Cited

UNITED STATES PATENTS

| | | | |
|---|---|---|---|
| 2,914,855 | 12/1959 | Daum | 33/74 D |
| 3,321,248 | 5/1967 | Williamson et al. | 33/46 AT X |
| 3,416,230 | 12/1968 | Oleson et al. | 33/1 H |

*Primary Examiner*—William D. Martin, Jr.
*Attorney*—Joseph C. Kotarski, Henry H. Huth, Robert B. Coleman, Jr., William J. Miller and David H. Hill

[57] ABSTRACT

A method and apparatus for aligning kinematic trains of industrial apparatus by optical metrology, the method including the steps of establishing a reference line of sight adjacent the devices in the kinematic train and extending generally parallel to the train, then obtaining precise measurements to the shortest distance to the reference points on the several devices by optical measurements. The measurements are made when the apparatus is in a cold, inoperative state. Then, after the apparatus has become heated and is in operation, a reference line of sight is again established adjacent the devices in the kinematic train, and then the shortest distance is then measured from the line of sight the same reference points on the devices that were used in obtaining the cold measurements. Comparison of the sets of hot and cold measurements is then made to determine the shift or change in position of the devices relative to each other which has occurred in the course of the operation of the apparatus.

7 Claims, 5 Drawing Figures

INVENTORS
ROBERT L. BLUBAUGH,
ROBERT A. RUCKLE &
HUBERT J. WATTS
BY William J. Miller
ATTORNEY

INVENTORS
ROBERT L. BLUBAUGH,
ROBERT A. RUCKLE &
HUBERT J. WATTS
BY William J. Weille
ATTORNEY

METHOD AND APPARATUS FOR OPTICAL ALIGNMENT OF INDUSTRIAL EQUIPMENT

RELATED APPLICATIONS

This application is a continuation-in-part of U. S. patent application Ser. No. 702,478 filed Feb. 1, 1968, titled "Adapter Device for Optical Alignment Scales" now abandoned and patent application Ser. No. 836,503 filed June 25, 1969, titled "Method and Apparatus for Optical Alignment of Industrial Equipment" and assigned to the assignee of the present application.

BACKGROUND OF THE INVENTION

1. Field of the Invention

This invention relates to methods and apparatus for optically aligning machinery, and more particularly, to a method and measuring devices used for identifying with precision, the distances which various points on machines connected in a kinematic train shift during the operation of such machines.

2. Brief Description of the Prior Art

One of the most difficult problems in the alignment of a kinematic train of machines is knowing the final alignment after the machines are hot. The problem of aligning the shafts properly is successfully done while the machines are cold by mounting indicators between the shaft ends, with the inner couplings removed and rotating one shaft with respect to another. This method will at least determine if the shaft ends are in the same vertical and horizontal plane; however, the system presents difficulties in determining if the axis of the shafts are in the same vertical and horizontal plane. One reason for this is that the coupling diameters are fairly small in comparison to the total rest of the machine. For example, the coupling diameter could be between 4 to 6 inches while the rest of the machine may be as much as 8 to 15 feet. Therefore, an extremely small error in determining proper alignment of the couplings may still result in an extremely large error in the actual alignment of the axis of the shaft.

An article in the December 1956 issue of *Power Magazine* on page 117, titled "Telescope—Mirror Alignment Method," by Herman Schultz, describes a method for alignment of a train of machines such as turbine generator units using a telescope in conjunction with a plurality of mirrors. This system, however, has grave problems so far as accuracy is concerned. Any slight tilt in the position of the mirror will cause a large error in the reading. The magnitude of the error, of course, depend upon the distances involved.

In all alignment systems it is necessary to remove the alignment equipment and at some future time replace the equipment to recheck the system. It is important under these conditions to be able to compare these readings over an extended period of time. Any positioning errors that cannot be absolutely accounted for will result in erroneous alignment information. Furthermore, the system disclosed in *Power* is successful only for vertical alignment changes. It is virtually impossible to conceive a successful method for utilizing the principles or teachings in this article for horizontal changes in equipment alignment.

Clark Equipment Company devised a system for optically aligning a kinematic train by welding to opposite ends of each machine housing, a pair of one-inch angle irons, one of which was mounted substantially in line with the horizontal axis and the remaining angle iron was mounted in line with the vertical axis of the bearing and at each end of the machine housing. The angle iron extended beyond the machine housing sufficiently to permit visual access to the end of the angle iron. On the end of each piece of angle iron was welded or rivited a scale. A transit was then set up in position by mounting it to a platform affixed to the housing of a machine. Readings were then taken on the movement of each piece of angle iron at each horizontal and vertical location on the housings of the machine. The system was unsuccessful for several reasons. First, since the transit was mounted on the housing of the machine the vibration of the machine made the reading of the transit extremely difficult. Second, it was virtually impossible to calculate the expansion of the machine housing, the expansion of the angle iron, and the expansion of the scale, all of which were different and each unknown. Third, any slight accidental movement of the angle iron rendered the system inoperative. For example, if a worker in the area should accidentally bump the angle iron, the reading would be changed by several thousandths causing the machine, when positioned according to the erroneous readings to vibrate excessively. One extreme problem with the Clark Equipment system was that the angle iron could be very slightly moved and this slight movement was impossible to detect by the engineer. If the angle iron was moved sufficiently to be bent, of course, then the reading position could no longer be utilized. During the installation of a train of machines using the Clark system several of the points became unusable due to obvious bending of the angle iron by workers around the machine. The system never proved out and was eventually discarded.

A further problem with the Clark system was that once the engineers left, the angle irons were often used for foot and hand holds by the workers in the area who needed access to the top of the machines, thus totally destroying the effectiveness of these points as a comparison at a later date.

BRIEF DESCRIPTION OF THE PRESENT INVENTION

In the method of alignment of a train of drivingly interconnected machines as practiced in accordance with the present invention, reference points are first established on the machines in the train to permit measurements to be made between these points and lines of sight established adjacent the machinery. The measurements are to be made in a horizontal direction to evaluate horizontal alignment of the machines in the train, and usually it will also be desirable to take measurements in a vertical plane to evaluate the vertical alignment of the machines. The establishment of the reference points is preferably effected by securing tooling balls at selected locations on the machinery.

An optical sighting instrument is then positioned adjacent the machinery in the train on a stable supporting platform or base. This instrument is then used to optically establish a reference line of sight extending along side of (or over) the train of machinery. Then, while the machinery is in a cold or non-operating state, the temperature of the machinery and the ambient temperature are measured. The shortest distances from the reference line of sight to the several reference points are then measured. These measurements are made along lines extending normal to the line of sight between this line and the several reference points. The initial set of such measurements is made while the machinery is in the cold, inoperative status. At this time the extent to which the several machinery units are aligned (or misaligned) is known, as a result of alignment measurements made using known millwright procedures. The initial "cold" measurements made in accordance with the present invention are thus made from units of machinery which occupy a known alignment relationship to each other at this time.

After the set of "cold" readings has been obtained in the manner described, the machinery is operated and is thus subjected to the vibrational and thermal stresses which are developed. Due to these forces, the units of machinery in the kinematic train will frequently be caused to drift or move out of alignment to a degree such that undesirable distorting forces are developed in the interconnecting shafting and transmitted to bearings, rotors and the like so that these elements are ultimately damaged and fail. Previously, the most widely used method of evaluating the extent to which such operating misalignment occurred was simply to attempt to mathematically calculate the effect of thermal expansion of the machinery units in the kinematic train, basing such calculations upon the known thermal expansion properties of the materials of construction of the machinery, and the estimated operating and environmental temperatures. This method did not take into account vibrational stresses, steam pipe expansion, and other acting forces, and was seldom more than a rough approximation of what might be expected in the way of realigning shifts in the positions of the units in the train.

Using the method of the present invention, the change in alignment occurring during operation is actually measured. Thus, while the machinery is hot and in operation, a second set of measurements are made from the same reference points on the machinery to an optically established, reference line of sight. There are also obtained at this time, measurements of the temperature of the machinery and of the ambient environment. The set of hot measurements is then corrected as may be required to compensate for thermal expansion of the measuring apparatus, and for thermal expansion of the machinery which causes the reference points to be displaced from the central longitudinal axes of the machinery units on which the reference points are located. These corrected hot measurements are then compared with the set of cold measurements in a manner to obtain a convergence factor which is used to correct the "hot" line back to the "cold" line position, and then evaluating the extent to which the units in the train have moved as a result of operation.

The accuracy with which the described measurements are made is extremely important, since the development of a few thousandths of an inch misalignment between machines interconnected by shafting can result in early failure of bearings and other elements of the apparatus. To the end of more accurately measuring the normal distances between the line of sight and the reference points, certain apparatus has been conceived and developed specifically for this purpose. This apparatus may be generally described as functioning to support, and facilitate the positioning of, a commercially available optical scale so that it may be more accurately and flexibly utilized. Broadly described, the apparatus comprises an elongated scale holder shaft which has an elongated, scale-receiving slot extending along a portion of its length for receiving the optical scale, means for securing the scale to the shaft, and a contact tip connected to one end of the shaft for contacting a reference point on the machinery. The apparatus may further include structure for supporting the scale holder shaft in selected positions in which the optical scale intersects the reference line of sight while extending along a line normal to the line of sight and containing the reference point. This supporting structure includes a vertical standard having a clamping device pivotally mounted thereon for clamping the scale holder shaft, or an appendage thereof, in desired position. A horizontal stabilizer rod is also provided which can be secured at one end to a point of support, and then extended outwardly in a generally horizontal direction to permit a second clamping device to be used to connect the stabilizer rod to the scale holder shaft, or to an appendage thereof.

An important and broad object of the invention is to provide a method for evaluating the alignment of machinery which is drivingly interconnected in a kinematic train.

A more specific object of the invention is to accurately identify the precise relative locations of the machinery units in a kinematic train while such units are functioning at operating temperatures.

An additional object of the invention is to provide optical metrology apparatus which can be effectively and easily employed to obtain highly accurate measurements from a reference line of sight to reference points spaced horizontally along interconnected machinery.

Additional objects and advantages will become apparent as the following detailed description of the invention is considered in conjunction with the accompanying drawings.

BRIEF DESCRIPTION OF THE DRAWINGS

FIG. 4 is a cross section taken through lines 4—4 of FIG. 6;

FIG. 4a is a cross section of FIG. 6 taken through the section labeled 4a–4a;

FIG. 5 is a sectional view taken along line 8—8 of FIG. 6;

FIG. 6 is a partially sectional, partially elevational view of a preferred embodiment of a scale holder device constructed in accordance with the invention, and depicting a scale mounted in the device, and a viewing box and compound spirit level attached to the scale holder device.

FIG. 6a shows a means for attaching the end of the device shown in FIG. 6 to a tooling ball and retaining it against the tooling ball when the apparatus is in a horizontal position;

DETAILED DESCRIPTION OF PREFERRED EMBODIMENTS OF THE INVENTION

In referring to the structure shown in the drawings, lead lines having arrowheads are used to designate broad structural combinations. Lead lines not having arrowheads are used in referring to individual structural elements.

The apparatus to be described is utilized in the method of the invention for checking or evaluating the optical alignment of a plurality of machinery units which are drivingly interconnected in a kinematic train. For example, such a train of machinery may include compressors and turbines which are interconnected through a coupling between input and output shafting. It is important that the individual machinery units in such train be maintained within certain alignment tolerances, since misalignment or angulation of one unit with respect to another in the train imposes destructive stresses upon the coupling, shafting, bearings and the like.

As has been previously indicated, it is presently possible, and is the practice, to obtain alignment measurements when the machinery is in a cold inoperative state by taking so-called dial indicator readings (usually performed by millwrights), and from these readings determining any offset of one unit which might exist with respect to another. The dial indicator readings also permit determination of any angulation of the axes or rotation of the shafts of adjacent units. The same method cannot be used, however, to measure or evaluate any shifting or change of position of the units in the train at a time when these units are heated and operating. The method of the present invention allows identification of the extent of change in the relative locations of the several units which has occurred during operation, so that any misalignment which occurs as a result of operation can be recognized and corrected.

Figures 1, 2:
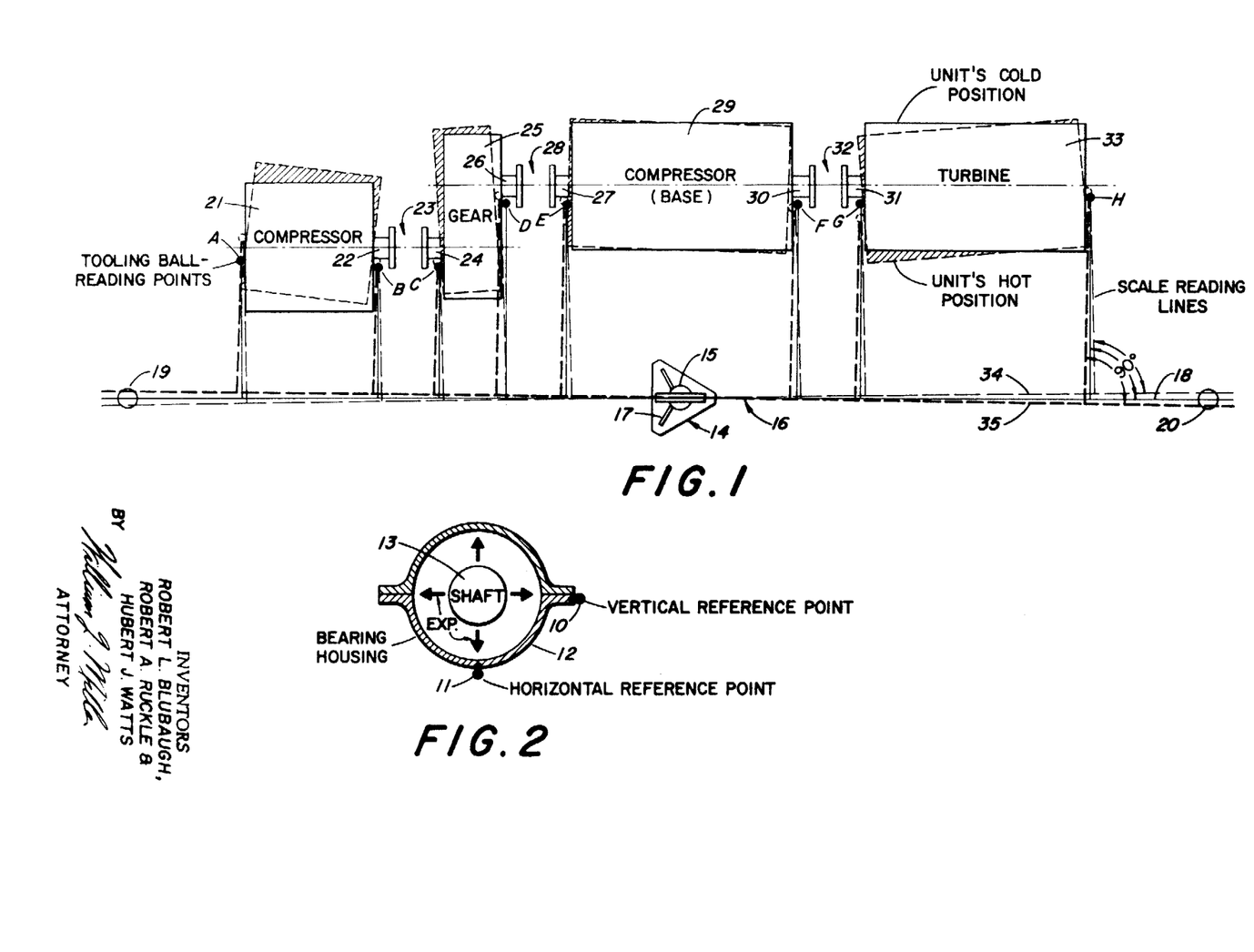
FIG. 1 is a plan view of kinematic train illustrating the method of this invention.
FIG. 2 is a cross section of a bearing and shaft illustrating in particular the preferred mounting of tooling balls.

In FIG. 1 of the drawings, the relationship of the kinematic train, transit instrument, bench marks and line of sight is illustrated. Thus, there are here shown a compressor 21 which has an output shaft 22 connected through suitable coupling 23 to the input shaft 24 of a gear box 25. The output of gear box 25 is connected through a shaft 26 to a shaft 27 of compressor 28 by means of a coupling 29. The output of compressor 28 comprises a shaft 30 which is connected to a shaft 31 through a coupling 32 to a turbine 33. The compressor 21 has secured on each end of the bearing (as explained in FIG. 2) one or more tooling balls at each bearing of the machine; for example, tooling balls a and b. The gear box 25 has mounted thereon a tooling ball c and a tooling ball d which is as nearly axially in line with shaft 24 as possible. Compressor 28 has mounted thereon tooling balls e and f while turbine 33 has mounted thereon a pair of tooling balls g and h.

In the practice of the method of the invention, see FIG. 2, the physical environment of the kinematic train which is to be checked for alignment is first observed to determine where reference points (a–h for example) for taking certain measurements can best be established on the several machinery units in the train, and also where a reference line of sight 16 may be optically established so as to extend alongside of, and substantially parallel to, the kinematic train with free and unobstructed access to the reference points. In other words, the reference points a–h and the line of sight 16 must be located in such a way relative to each other that distance measurements can be made between the reference points and the line of sight along lines which extend normal or 90° to the line of sight.

Referring to FIG. 2, it is desirable in the establishment of reference points on the machinery units in the kinematic train to place these reference points as near to the center line of the shafting of the machinery as possible, and also to establish the reference points in locations which are accessible to the measuring apparatus which is utilized in the method, this being constituted by the scale holder devices and optical scales hereinbefore described. It is also best to place the reference points on the lower shell of the machine, so that maintenance requiring removal of the upper housing does not disturb the location of the said points. We have determined that the best reference points are constituted by small spherical tooling balls 10 and 11 set permanently into the lower bearing housing 12 of the machinery at locations which are substantially in horizontal alignment with the axis of rotation of the shafting 13 and which are located as near to this axis as physically possible. It is, moreover, desirable to have at least two of the reference points a or b of FIG. 1 located adjacent opposite ends of each unit of machinery, and separated by the maximum linear distance possible and with the desirability of having at least two reference points located on each of the units.

In considering where the line of sight 16 should be established, it is borne in mind that this line of sight is established with a transit for purposes of making certain horizontal measurements, and with a tilting level instrument for obtaining certain vertical measurements where both horizontal alignment and vertical alignment along the train are to be investigated. Considering first the horizontal alignment procedure, it is necessary that a stable base platform 14 be located for setting up the transit 15 for establishing the reference line of sight 16. This base for the transit will, of necessity, be offset to one side of the train, and must be located so that a clear line of sight can be extended substantially parallel to the line along which the train extends, or more specifically, the line along which the axes of rotation of the shafts involved may extend. It is, moreover, desirable that the base for supporting the transit 15 be located so that the line of sight from the telescope of the transit need not be extended more than about thirty feet in each direction from the transit in order to reach to the opposite ends of the kinematic train. In some instances, this desideratum will dictate that the transit be set up about midway of the kinematic train, and in other situations where the train is relatively short, the transit may be set up at either end of the train. The instrument of the transit is then leveled and cross-leveled by adjustments provided in the conventional transit apparatus.

In the next step of the procedure, the temperature of each machinery unit is measured by any suitable means and the ambient or surrounding atmospheric temperature is also measured. These measurements of temperature are taken at a time when the machinery and the train is cold and in the nonoperating state. The measurements of temperature on the machinery units are taken as near to the several reference points as possible, and, with the ambient temperature, are noted for subsequent usage in a manner hereinafter described.

It may be pointed out that the exact location of the legs 17 of the transit on the base 14 or supporting structure is carefully noted at this time, since it will be desirable at a subsequent point in the procedure to return the transit as nearly as possible to the same location on the base structure. It should also be noted that the base structure 14 which supports the transit should be as free from vibrational disturbance as possible.

With the transit thus positioned, and the temperature measurements taken, a clear line of sight 18 is then established as nearly parallel to the axis of rotation of the shafts along the kinematic train as is possible by visual estimation. Then, either at this time or subsequently, two aligned bench marks 19 and 20 are established on the line of sight by suitably scribing structure which is in the line of sight, or by placing suitably scribed target-type bench marks on the line of sight. The bench marks must also be located on a stable structure, and must be relatively free from vibrational disturbance.

Figure 7:
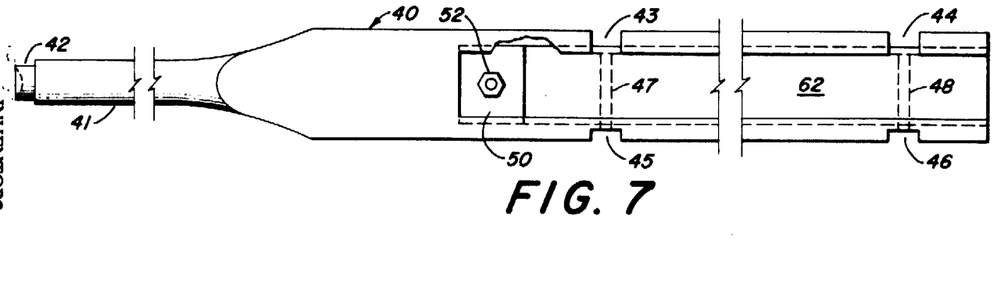
FIG. 7 is a side elevation view of one embodiment of a scale holder device constructed in accordance with the invention.
Figure 7A:
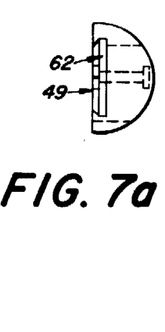
FIG. 7a is an in view of FIG. 7.

Once the "cold" line of sight 18 has been established, the bench marks properly placed in accordance with proper engineering practice, the machine or element of the kinematic train with the longest distance between tooling balls at each end of the machine is selected as the base unit for establishing all future measurements. The reason a base unit machine is selected is that it is virtually impossible to even establish an accurate set of bench marks. In the accuracies that are involved in aligning a train of machines, movement of a bench mark by a few thousandths of an inch will cause misalignment or apparent misalignment of the train of machines. It is obvious that heat, cold, wind, vibration, earth movements, settling, and any of a myriad of additional natural factors will cause a bench mark, regardless of its solidity, to move by a few thousandths of an inch. These errors cannot be detected and accounted for; therefore, one piece of equipment on the train of machines is selected as the base unit and all measurements are made relative to movement around the base unit. The measurements are then made by placing against the tooling ball a piece of measuring apparatus. A simplified form of such apparatus is shown in FIGS. 7 and 7a and essentially comprises a rigid shaft 10, a tooling ball mating socket 14 and a scale 62. The equipment will be described in particularity at a latter portion of this application. The measuring rod is placed against the tooling ball and horizontal measurements are taken. It is absolutely necessary that the rod scale face be normal to the line of sight 18. Thus, the rod must be moved back and forth to and away from the transit until the proper positioning is ascertained. A simplified version, of course, will be when shortest distance on the scale is measured from the tooling ball to the line of sight 18. The rod must also be horizontal and for this purpose a good bubble level will suffice. If, for example, the compressor 28 is selected as the base unit, then the readings on tooling balls $e$ and $f$ will be determined and these readings will, in the future, be used to establish the line of sight. All of the remaining readings are then taken in similar manner at tooling balls $a$ through $h$. Special equipment has been invented to assist in determining when the measuring rods are normal to the line of sight. Such equipment is completely described in FIGS. 5 and 6 and will be subsequently described in detail.

Once the horizontal cold readings are taken the vertical readings are taken in like manner, the only exception being that a tilting level is used rather than a transit. Once all the vertical and horizontal readings have been recorded and verified by resetting the readings untill less than a two-thousandths error is established by the succeeding readings, the machinery is then energized and heated to its normal operating temperature. This implies that the turbine will be energized and the compressors will be operated at their normal operating loads.

After the temperature of the equipment has been stabilized and recorded, the transit should be replaced on the base 14 and the leg positions re-established as close as possible to the location they previously occupied on base 14. The transit is then realigned with the bench marks as close as possible. The transit need not be absolutely re-aligned with the old bench marks for several reasons. First, it would require an excessive amount of time to realign the transit with the old bench marks. Second, there is no assurance that the bench marks have not moved; therefore, even if the transit was perfectly realigned it may not have the new line of sight coincide with the old or original "cold" line of sight 18. The measuring rods are then placed successively on tooling balls $e$ and $f$ and the distance from these tooling balls to the present line of sight, for example, line of sight 34, is determined. If the new distances between tooling balls $e$ and $f$ is within approximately 50 thousandths of an inch of the old reading, then the new line of sight 34 is satisfactory for alignment purposes. Since only relative movement of the units of the kinematic train can be determined with respect to some fixed point, it is necessary only to determine a line of sight which is parallel to the axis of the shaft of the compressor 28 which, as previously mentioned, was determined as the base unit. Thus, a 50 thousandths of an inch error or less will not introduce sufficient error into the system that the high degree of accuracies necessary will be lost. Once the distances between the tooling balls e and f are determined, calculations are made to connect the present line of sight 34 to the theoretical line of sight 35, for example, which is the line of sight parallel to the axis of compressor 28. Even if compressor 28 moved, and such is highly likely, we are establishing only relative movement between the units thereby for all practical purposes the calculations will consider the compressor 28 did not move. Once the calculated line of sight has been established all movement of the remaining units, regardless of their number, will be calculated not from the present line of sight but from the calculated line of sight 35. The measurements both horizontally and vertically are next made on each of the remaining tooling balls $a$ through $h$ in FIG. 1. The procedure for making certain the measuring rod is at right angles to the line of sight is also followed in the new measurements.

Figure 3:
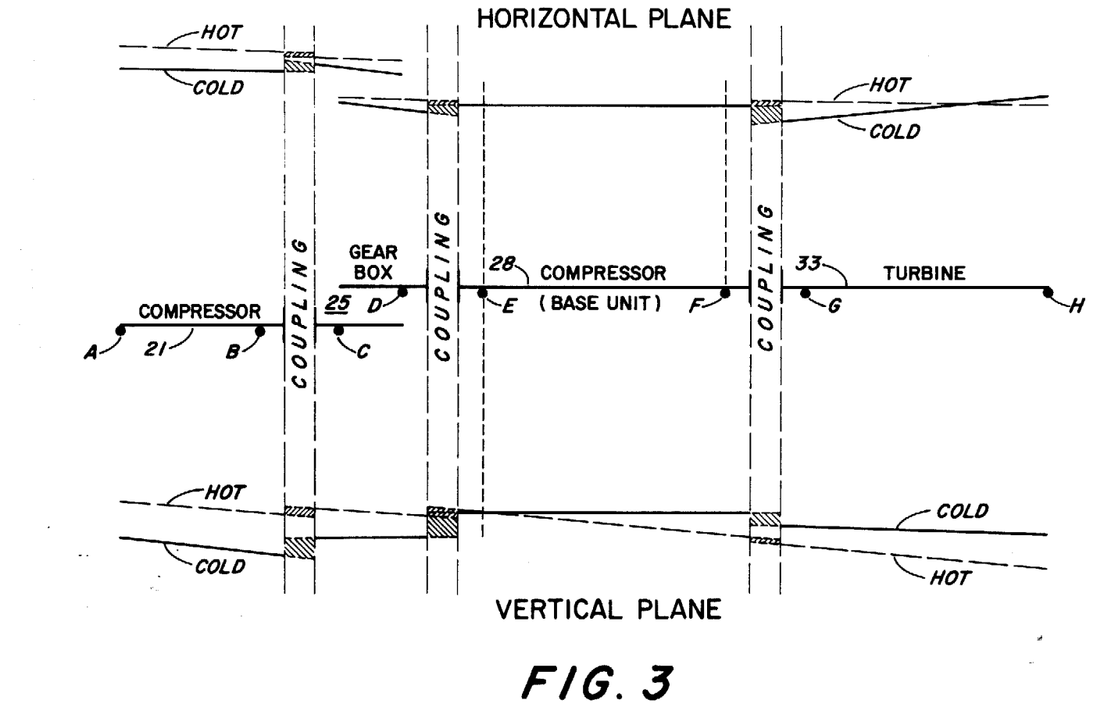
FIG. 3 is a schematic plot of the alignment of kinematic train in both the horizontal and vertical plan during cold and hot conditions.
Figure 3A:
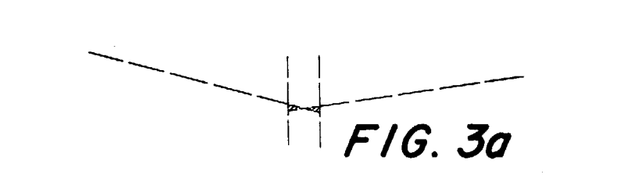
FIG. 3a is a partial plot of a pair of particularly misaligned shafts.

Once all the measurements are taken a readout, as shown in FIG. 3, is made for the train of machines. Thus, the distance of each of the equipments, for example a compressor 21, gear box 25, compressor 28, and turbine 33, are read out as shown in the center portion of the drawing with the location of the tooling balls located in proper scale. The cold readings for both the horizontal and vertical plane are then plotted accurately. The cold readings here are shown in solid line. In the horizontal readings it should be noted that the cold and the hot readings will be identical since both ends of the compressor were used as the base plane. In the vertical, however, it is necessary to use only a single tooling ball. For this purpose tooling ball $e$ was used as the base point, thus at this point it will be noted no movement will be apparent in the hot readings. All other points will, of course, move with relationship to tooling ball $e$. The shallowed area shows the intersection of the shaft center lines inside the coupling. Each coupling can accommodate a certain amount of misalignment between shafts. Some couplings, for example, can accommodate up to 20 thousandths of an inch misalignment of the axis of the shafts. An intersection of the type in FIG. 3a will cause whipping of the coupling and result in early failure of the coupling. None of the units shown in FIG. 3 is severally misaligned since each is within a few thousandths of an inch of a proper axial alignment. Furthermore, none of the units shows the intersection of the center line of the shafts inside the coupling. Thus, a train of kinematic machines aligned in accordance with FIG. 3 should operate properly.

It is apparent by viewing FIG. 3 that each of the machines in the cold alignment is deliberately misaligned in order to accommodate known shifts in the bearings and framework of the equipment as the machine heats. Thus, machines may be considerably out of alignment when cold and in perfect alignment when hot. Most machines are aligned when cold in accordance with manufacturers' specifications since each manufacturer of the individual components in the kinematic train has studied the expansion of the material, the hearing of the bearings, movement caused by steam pipes attached to the equipment, etc. Taking these predicted movements into consideration, the manufacturer forecasts the position of the shaft once the machine is heated. The equipment described herein and the method set out will with precision determine if the manufacturers predictions and forecasts were correct.

In many instances it has been determined that through an oversight in cooling procedure for the bearings, improperly hung steam pipes and other factors, the machines do not always perform in accordance with the manufacturers' expectations thus severe damage has been alleviated knowing absolutely the precise position of the machines when the system is cold and hot. This system set out has a further advantage over the previous methods in that at any future date the alignment of the equipment can be certified while the equipment is running without the necessity for shutting down the plant. Thus, for example, a natural disturbance such as an earthquake, unexpected settling, etc. may cause questions to arise during the operation of the equipment as to whether or not the equipment is still in proper alignment. The system as previously described can accurately determine if the train of equipment is still in accordance with its previous alignment—all without shutting down the plant to make the determinations.

DESCRIPTION OF APPARATUS

Referring initially to FIGS. 7 and 7a of the drawings, the scale holder device of the invention, in one embodiment, includes shaft means 40 which comprises an elongated rod 41 and a metal contactor 42. The elongated rod 41 is constructed of a material having a low coefficient of thermal expansion, with a phenol-formaldehyde resin having asbestos fibers embedded therein. A material of this type is sold under the trade name SYNTHANE by the Synthane Corporation of 15 River Road, Oaks, Pennsylvania.

The contactor 42 is preferably made of stainless steel and includes an elongated shank portion (not shown) which carries a spiral groove around its periphery to accommodate glue, and to retain the shank portion securely in an elongated bore formed in one end of the rod 41. The contactor 42 is provided with a frustospherical concavity illustrated in dashed lines in FIG. 7, and employed for the purpose of fitting over the tooling balls $a-h$ previously described.

It will be noted that the end of the rod 41 which carries the metal contactor 42 is of relatively small diameter, and that the rod is then enlarged at a point intermediate its length to a relatively large diameter. At this point, the rod 41 assumes a semicylindrical cross sectional configuration over the remainder of its length. As shown in FIGS. 7 and 7a, the rod 41 is transversely relieved or notched at a plurality of locations spaced along its length, with two such reliefs or notches, 43 and 44, being depicted in FIG. 7. It will further be noted that disposed on the opposite sides of the rod 12 from the notches 26 and 28 are another pair of transversely extending notches 45 and 46. The notches 45 and 46 communicate with the notches 43 and 44 through a pair of transversely extending holes 47 and 48, respectively.

Extending longitudinally along the elongated rod 41 from its end opposite the end carrying the metal contactor 42 is a scale-receiving slot 49 (see FIG. 7a). A stop plate 50 mounted at the end of slot 49 by bolt 52 is made of a hard metal having a low coefficient of thermal expansion.

Quick-connect clamps (not shown) are utilized to connect a graduated optical tooling scale 62 in an invariant or fixed position in the scale receiving slot 49. The clamps fit in slots 43–45 and 44–46 to receive the scale 62 in the rod 40.

The optical scale 62 is conventionally constructed of a metal having a very low coefficient of thermal expansion, and this factor, coupled with the fixed position of the metal stop plate 50, and the resistance to wear of the metal side thereof which abuts the edge of the optical scale, assures that when this scale is clamped in the rod 40, it will, upon each occasion of use, occupy the same position as it may have previously occupied during a prior use.

As will be hereinafter described, the concavity formed in the outer free end of the metal contactor 42 facilitates the placement of the scale holder device 40 in precise and firm contact with a tooling ball which is placed on machinery to be aligned, and which is used as a reference point from which measurements are made using the optical scale 62 carried by the scale holder device 40. The tapering of the rod 40 to a very small diameter at its end which carries the metal contactor 42 assures that the metal contactor may be directed by the rod through a very close or confined space so as to bear against a selected reference point, even though the latter is relatively inaccessible. Moreover, where tooling balls are used as reference points in accordance with a preferred practice of the method of the invention, the formation of the concavity to mate with such tooling balls permits the rod 40 to be more easily extended in a plurality of directions and permits the rod and the optical scale 62 to be utilized to measure from the tooling ball to reference lines of sight located in various orientations with respect to the machinery as hereinafter described.

Figures 4, 4A, 5, 6, 6A, 6B:
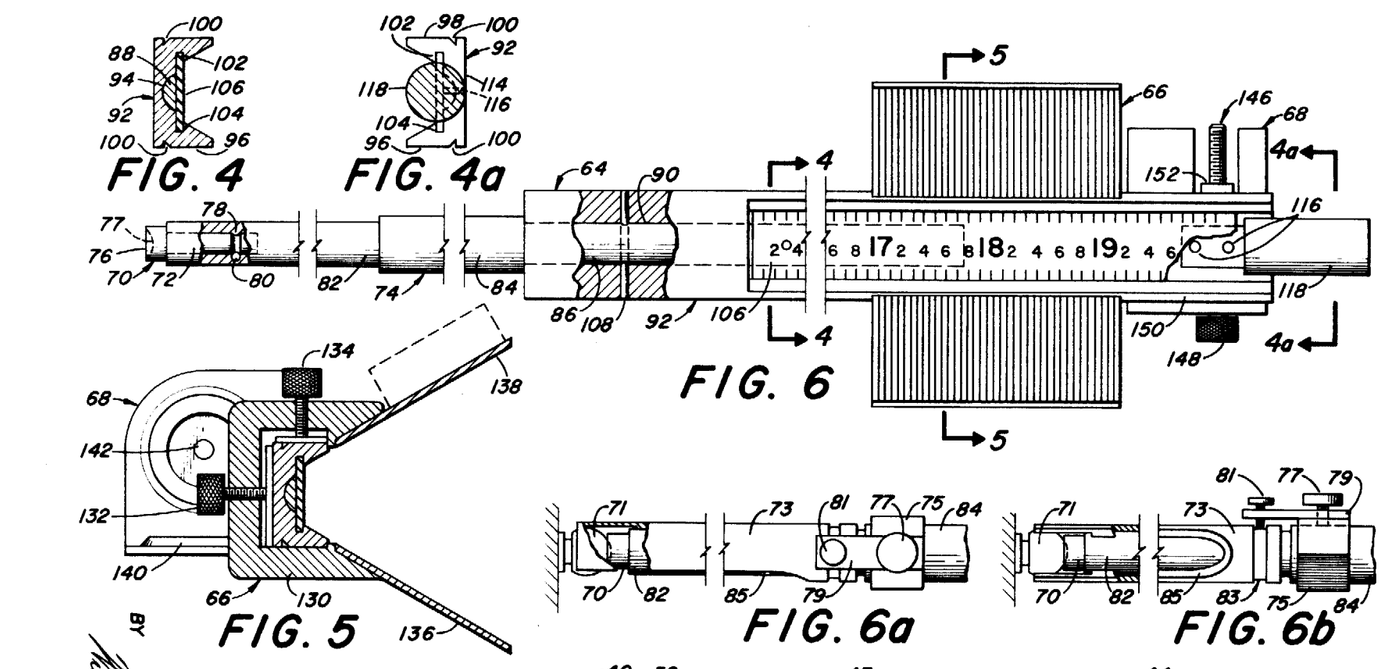

A preferred embodiment of the scale holder device of the invention is depicted in FIGS. 4–6 and is designated generally by reference numeral 64. As shown in FIGS. 4–6 the scale holder device 64 is utilized in the practice of the method of the invention with a viewing box, designated generally by reference numeral 66, and with a compound spirit level, designated generally by reference numeral 68. It should be pointed out that the viewing box 66 and compound spirit level device 68 can also be utilized with the scale holder device for purposes of leveling and normalizing as will be hereinafter described when referring to the mode of use of the scale holder devices in the method of the invention. These structural elements form no portion of the present invention, but are merely adjuncts to the use of the apparatus of the invention.

The scale holder device 64 includes a stainless steel contactor 70 which has an elongated shank 72 extending to a mating bore formed in one end of a metallic rod 74 which is made of a metal having a low coefficient of thermal expansion as hereinafter explained. The contactor tip 70 further has a head portion 76 attached to the shank 72, and this head portion is provided with a semi-spherical recess 77 at its free end for mating contact with a tooling ball reference point as hereinafter described. The shank 72 of the contactor 70 is provided with a circumferential groove 78 which permits the contactor to be secured in place in the end of the rod 74 by means of a transverse securing pin 80. The securing pin 80 can be easily removed at such time as it may be desired to renew or replace the contactor 70. It should also be here mentioned that the contactor 70 can be mounted in the rod 74 by other methods, such as by forming a screw thread around shank 72 and screwing this into a threaded bore formed in the end of the rod.

As previously stated, the rod 74 is constructed of a metal having a low coefficient of thermal expansion, and is preferably constructed of Invar, a nickel alloy manufactured by the Carpenter Steel Company of Reading, Pennsylvania. The rod 74 includes a relatively small diameter cylindrical end portion 82, a relatively large diameter intermediate cylindrical portion 84, a relatively small diameter cylindrical intermediate portion 86, and a semi-cylindrical end extension 88. As best illustrated in FIGS. 6 and 7, the relatively small diameter intermediate portion 86 of the rod 74 extends into a cylindrical bore 90 formed in an elongated, scale receiving shaft designated generally by reference numeral 92.

The scale receiving shaft 92 is preferably constructed of aluminum, and in that portion of the shaft which extends beyond the bored portion receiving the relatively small diameter intermediate portion 86 of the rod 74, has the cross sectional appearance depicted in FIG. 4a. Thus, the shaft 92 has a semicylindrical groove 94 formed therein which receives the semicylindrical end portion 88 of the rod 74. The shaft 92 is further provided with a pair of substantially parallel side walls, 96 and 98, which are each provided with inwardly extending grooves 100. Adjacent the semicylindrical slot 94, the shaft 92 is provided with a pair of opposed scale receiving slots or grooves 102 and 104. An optical scale 106 is positioned in the grooves 102 and 104 and over the semicylindrical end portion 88 of the rod 74 in a manner hereinafter described.

For the purpose of retaining the rod 74 in its position of insertion in the shaft 92, a securing pin 108 extends transversely through the shaft, and through a suitable diametric aperture formed in the small diameter intermediate portion 86 of the rod 74 as best illustrated in FIG. 6.

At its end opposite the end into which the relatively small diameter intermediate portion 86 of the rod 84 is extended, the shaft 92 carries a projecting semicylindrical extension 114 which is preferably formed integrally with the remainder of the shaft. Secured by suitable pins or screws 116 to the flat upper side of the semicylindrical extension 114 is a semicylindrical top member 118 which is complementary in configuration to the semicylindrical extension 114 and thus forms a round cross sectional element projecting from the end of the shaft 92.

The optical scale 106 is mounted in the scale holder device 64 by removing the top member 118 from the semi-cylindrical extension 114 and passing the edges of the scale into the slots 102 and 104 formed in the rectangularly cross-sectioned portion of the shaft 92. The optical scale 106 is secured against sliding movement in the slots 102 and 104 by extending a pin (not shown) through a small hole formed in the scale 106 and into a registering hole formed in the semicylindrical extension 88 of the rod 74. It will be noted that the inner end of the optical scale 106 abuts a shoulder formed on the rod 74 at the location where the relatively small diameter intermediate cylindrical portion 86 of the rod is joined to the semicylindrical extension 88 thereof.

The scale holder device 64 is constructed in the manner described to reduce to a minimum, the error introduced in scale readings as a result of changes in the thermal environment. In other words, the Invar material hereinbefore described of which the rod 74 is preferably constructed as a very low thermal expansion, and the aluminum metal of which the shaft 92 is constructed, while undergoing some elongation and contraction with changes in the thermal environment, minimally affects the location of the optical scale 106 during these movements because of the manner in which the scale is pinned to the Invar rod 74, and the manner in which the shaft 92 is attached by the screw 110 to the semicylindrical extension 88 of the rod 74.

Adjustably positioned along the length of the shaft 92 are the viewing box 66 and the dual spirit level device 68. The structure and functions of these devices are described in detail in co-pending U.S. patent application Ser. No. 828,911 titled "Method and Apparatus for Optical Alignment" filed May 29, 1969 and assigned to the assignee of the present application. For sufficiency of detail in hereinafter describing the method of the present invention, however, it may be pointed out that the viewing box 66 includes a C-shaped channel member 130 which can be clamped to the shaft 92 of the scale holder device 64 by means of set screws 132 and 134, and which has secured to the parallel legs thereof, a pair of diverging plates 136 and 138. The plates 136 and 138 carry on the opposed or facing surfaces thereof, a series of fine parallel lines which are preferably spaced from each other by a distance of about 0.025 inch. These lines are used for positioning the scale holder device 64 and the optical scale 106 which it carries along a line which extends normal to a reference line of sight in the practice of the method of the invention as hereinafter described. The same or a similar viewing box is utilized with the scale holder device 40 shown in FIGS. 7 and 7a for substantially the same purpose.

The compound spirit level device 68 includes a pair of bubble or spirit levels 140 and 142 which are mounted at right angles to each other on a suitable bracket. The bracket can be clamped to the shaft 92 of the scale holder device 64 by means of a screw and flange assembly which includes a threaded bolt 148 which extends through a pair of flanges 150 and 152 and functions to draw these flanges toward each other so that the compound spirit level 68 may be clamped to the sides 96 and 98 of the shaft 92. It will be apparent that both the viewing box 66 and the compound spirit level 68 are adjustable in their positioning along the shaft 92.

In taking the horizontal measurements, it often times becomes difficult to hold the steel contactor 70 against a tooling ball. If, for example, the end should slip the entire rod may drop striking a hard object, causing severe damage to the rod or contactor 70, thereby rendering the contactor unusable by impairing its accuracy. In order to alleviate this problem a holding mechanism was devised shown in FIGS. 6a and 6b. The holding mechanism essentially comprises a tubular extension 73 mounted around cylindrical end portion 82 and secured by a clamp 75 which has a thumb screw 77 mounted normally through clamp 75 adapted to engage the enlarged end portion 84. Extension 79 secured to clamp 75 has mounted normal therethrough a secure screw 81 adapted to engage a peripheral groove 83. Groove 83 permits 360° rotation of tubular extension 73. A portion 85 of tubular extension 73 is removed to permit cylindrical portion 82 to fit into tight places in some machine trains, thus extension 73 does not increase the diameter of the overall rod in the portion of the rod adjacent the machine housing. It should be noted, however, that a tubular extension 73 extends over a tooling ball 71 and supports the rod against accidental disengagement from tooling ball 71, thereby protecting the end contactor 70. It should also be noted that cylindrical extension 73 tends to protect end 70 during periods where the rod is being handled or moved against accidental damage.

Figure 11:
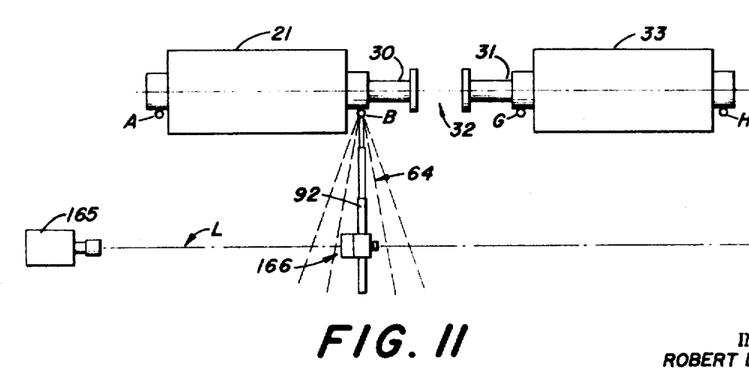
FIG. 11 is a schematic illustration of the manner in which certain laser apparatus is utilized in the practice of the method of the invention.

It should be pointed out before departing from a discussion of the method of the invention that substantially the same general method can be utilized employing a laser apparatus. This arrangement is schematically depicted in FIG. 11. In this figure, there is schematically illustrated a laser beam generator device 165 which directs a laser beam L along a line which extends substantially parallel to the axes of rotation of the shafts 30 and 31 of the compressor 21 and turbine 33, respectively. The scale holder device 64 is used as previously described. In this instance, however, a movable laser target 155 is movably positioned on the shaft 92 of the scale holder device 64 so that, by the use of a micrometer, the laser target can be shifted in very small increments of distance along the scale holder device. A precise reading of the exact location of the target 166 with respect to the optical scale 106 can be obtained from the micrometer device used to move the target along the shaft 92. The laser target 166 is sensitive to the intensity of the electromagnetic radiation in the laser beam L, and is constructed so that the highest intensity reading is obtained when the highly coherent light beam is exactly centered in a tiny bull's eye of the target. It is when the target has been moved to this position at which its readout system indicates that it is most nearly precisely aligned with the laser beam L that the scale reading is taken. Due to the high coherency of the light in the laser beam and the sensitivity of the laser target, it is possible with this type of apparatus and instrumentation to obtain very accurate readings of the distance between the reference line of sight and the reference points located on the machinery units in the kinematic train.

Figures 8, 9:
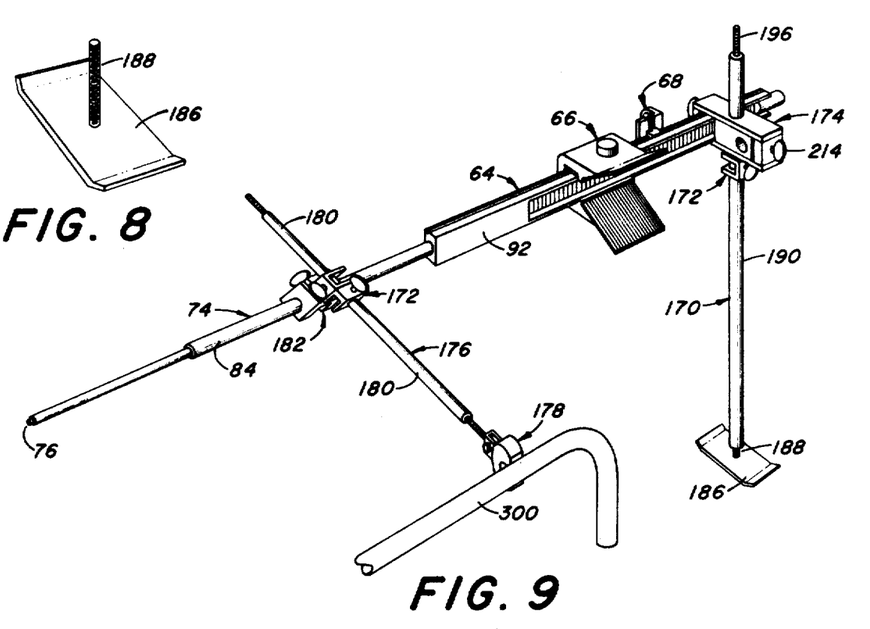
FIG. 8 is a perspective view of a base plate utilized with the vertical standard section shown in FIG. 10.
FIG. 9 is a perspective view illustrating the manner in which the scale holder device is utilized in conjunction with apparatus for supporting the scale holder device in certain preselected positions relative to machinery to be aligned in a kinematic train.
Figure 10:
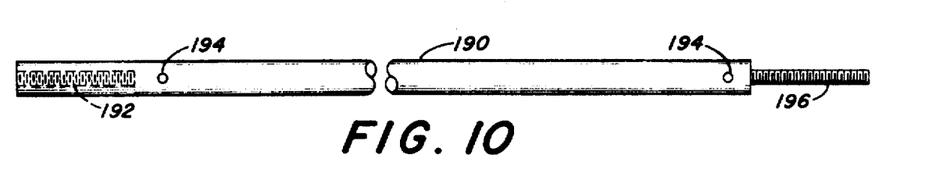
FIG. 10 is a side elevation view of a section of a vertical standard utilized in the scale holder supporting apparatus depicted in FIG. 9.

In FIGS. 8–10, there is illustrated apparatus used for supporting the scale holder device in a selected position to facilitate the realization of greater accuracy in performing the measuring functions hereinbefore described. With an accuracy of 0.001 inch within the capability of the measuring apparatus described, it is extremely difficult for a person to hold the scale holder device steady enough to avoid introducing errors which destroy this accuracy. Also, it is occasionally difficult or inconvenient for a person to find sufficient space adjacent the scale holder device to position himself there for the purpose of holding the scale holder device in a measuring position. The supporting apparatus alleviates these difficulties.

As shown in FIG. 9, the supporting apparatus includes an upright or vertical standard structure designated generally by reference numeral 170. A supporting clamp 172 is secured in a selected position on the vertical standard structure. A swivel clamp 174 is supported on the supporting clamp 172, and swivelly receives the upper portion of the vertical standard structure 170. In use, the swivel clamp 174 is clamped to a portion of the scale holder device 64 which is extended through this clamp at a right angle to the vertical standard structure 170.

A stabilizer structure may also be used as a portion of the supporting apparatus, and is designated by reference numeral 176 in FIG. 9. The stabilizer structure includes a magnetic retaining element 178, rod sections 180, and a stabilizer clamp 182. The stabilizer clamp 182 is clamped about one of the rod sections 180 at a selected location, and about a portion of the scale holder device 64. Since the vertical standard structure 170, supporting clamp 172 and swivel clamp 174 can be used independently of the stabilizer structure 176, the former structures and their functions will be initially described in detail before discussing further the stabilizer structure.

The vertical standard structure 170 includes a base plate 186 (see FIG. 8) which has secured to the central portion thereof, an upwardly projecting threaded bolt 188 which carries very fine threads. The vertical standard structure 170 further includes at least one rod section 190 of the type illustrated in FIG. 10. The rod section 190 has a bore 192 formed in one end thereof which is threaded to receive the threaded bolt 188. Spaced axially from the inner end of the bore 192 is a transverse aperture 194 formed diametrically through the rod section 190. The purpose of the aperture 194 is to permit a short handle bar to be extended through this aperture for the purpose of rotating the rod section 190 about its longitudinal axis, and thus to screw it up or down on the threaded bolt 188. At its end opposite the end in which the threaded bore 192 is formed, the rod section 190 carries a threaded projection 196 which is of the same diametric size as the bore 192 and as the bolt 188. The threaded projection 196 is provided with threads identical in size and pitch to the threads on the bolt 188, and formed in the bore 192. It should be pointed out that a plurality of the rod sections 190 are provided, and that due to the equal dimensioning of the threaded projections 196 and the threaded bore 192 therein, these rod sections can be screwed together to form an elongated member of the type depicted in FIG. 9.

Although certain preferred embodiments of the present invention have been herein described in order to provide an example of its construction and steps sufficient for usage by those skilled in the art, it is to be understood that various changes and innovations in the structure described, and in the method discussed, can be effected without departure from the basic principles of the invention. Changes and revisions of this sort which continue to rely on these principles are therefore deemed to be circumscribed by the spirit and scope of the invention.

What is claimed is:

1. The method of evaluating changes in the alignment of a plurality of machinery units, each having a drive shaft drivingly interconnected wherein the alignment of the drive shafts change when the plurality of machinery units are heated through operation, the drive shaft of each of said plurality of machinery units being supported by a bearing and bearing housing adjacent each end of the respective machinery unit comprising:

designating one of said plurality of machinery units as a base machinery unit;

optically establishing a first reference line of sight spaced from the plurality of machinery units and extending in substantially the same direction as that in which the interconnected plurality of machinery units extend;

measuring the shortest distance from each of a plurality reference points on said machinery units on the bearing housing at each end of each machinery unit to said reference line of sight while said machinery units are in an inoperative, unheated state, said shortest distance being measured by moving a measuring means arcuately about each of said reference points to obtain a minimum reading;

operating the plurality of machinery units to perform their intended function;

optically establishing a second reference line of sight spaced from the plurality of machinery units and extending in substantially the same direction as that in which the interconnected plurality of machinery units extend, said second reference line of sight being positioned in substantially the same direction from said interconnected plurality of machinery units as was said first reference line of sight;

measuring the shortest distance from said reference points to said second reference line of sight while said plurality of machinery units are at substantially operating temperature, said shortest distance being measured by moving a measuring means arcuately about each of said reference points to obtain a minimum reading; and correcting the second measurements taken from said base machinery unit to establish a theoretical line of sight corresponding to the first mentioned line of sight as the first mentioned line of sight existed with respect to said base machinery unit;

correcting the second measurements taken from the plurality of machinery units, excluding said base machinery unit, to said theoretical line of sight; and comparing the corrected second measurements taken from the plurality of machinery units, excluding the base machinery unit, with the first measurements taken from corresponding reference points to determine the change in alignment of the drive shafts of said plurality of machinery units.

2. The method of evaluating changes in the alignment of machinery units as defined in claim 1 wherein said first and second reference lines of sight are horizontally offset to one side of the machinery units in said kinematic train; and wherein said method is further characterized to include the steps of:

positioning a pair of bench marks in the vertical plane of said first reference line of sight and in a position visible from the point of origin of said first line of sight; and using said bench marks as an aid in locating said second line of sight.

3. The method of evaluating changes in the alignment of machinery units defined in claim 1 wherein said reference points are provided on said machinery units by securing tooling balls to said machinery units.

4. The method of ascertaining the alignment of the drive shafts of a plurality of machinery units drivingly interconnected wherein the alignment of the drive shafts change when the units are heated through operation, the drive shaft of each of said plurality of machinery units being supported by a bearing and bearing housing adjacent each end of the respective machinery unit comprising:

designating one of said plurality of machinery units as a base machinery unit;

establishing an unobstructed reference point on the bearing housing at each end of each of said plurality of machinery units;

extending a first beam of monochromatic, coherent electromagnetic radiation in a direction substantially parallel to said interconnected machinery units and spaced therefrom;

measuring the shortest distance from each of said reference points to a point of maximum intensity in said beam of monochromatic electromagnetic radiation while said machinery units are in an inoperative, unheated state, said shortest distance being measured by moving a measuring means arcuately about each of said reference points to obtain a minimum reading;

operating the plurality of machinery units to perform their intended function;

measuring the shortest distance from each of said reference points to a point of maximum intensity in a beam of monochromatic electromagnetic radiation extended in a direction substantially parallel to said interconnected machinery units and spaced therefrom, said measurements being made while said plurality of machinery units are at substantially operating temperature, said shortest distance being measured by moving a measuring means arcuately about each of said reference points to obtain a minimum reading;

correcting said measurements made while said plurality of machinery units are at substantially operating temperature for changes in temperature which have occurred from the non-operating, unheated state of said plurality machinery units to the operating status; then correcting the second measurements taken from the base machinery unit to establish a theoretical line corresponding to the line of maximum intensity of the first mentioned beam of monochromatic electromagnetic radiation as the line of maximum intensity of the first mentioned beam of monochromatic electro-magnetic existed with respect to the base machinery unit;

correcting the second measurements taken from the plurality of machinery units, excluding said base machinery unit, to said theoretical line; and comparing the corrected second measurements taken from the plurality of machinery units, excluding said base machinery unit, with the first measurements taken from corresponding reference points to determine the change in alignment of the drive shafts of said plurality of machinery units.

5. The method defined in claim 4 wherein said measurements are made by the steps of:

placing a target sensitive to the intensity of monochromatic electromagnetic radiation in a line extending substantially normal to said beam and including the respective reference point to which the measurement is being made;

shifting said target along said line normal to the beam until said target indicates it is positioned at a point of maximum intensity within said beam; and measuring the distance from the target to the respective reference point.

6. A method as described in claim 1 wherein said shortest distance is measured by an elongated distance measuring apparatus which is pivotal about a reference point.

7. A method as described in claim 1 wherein the shortest distance from each of said reference points is measured by placing an elongated distance measuring apparatus against the reference point and moving the elongated measuring apparatus toward and away from the origin of the respective reference line of sight until said shortest distance is determined.

* * * * *